United States Patent
Grussmann et al.

(10) Patent No.: US 11,566,550 B2
(45) Date of Patent: Jan. 31, 2023

(54) HOLDER FOR AN ELECTRIC HEATING ELEMENT IN AN EXHAUST-GAS AFTERTREATMENT DEVICE

(71) Applicant: BENTELER AUTOMOBILTECHNIK GMBH, Paderborn (DE)

(72) Inventors: Elmar Grussmann, Altenbeken-Buke (DE); Ulrich Rusche, Werl (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 17/669,089

(22) Filed: Feb. 10, 2022

(65) Prior Publication Data

US 2022/0251990 A1    Aug. 11, 2022

(30) Foreign Application Priority Data

Feb. 11, 2021  (DE) .................... 10 2021 103 287.3
Feb. 22, 2021  (DE) .................... 10 2021 104 117.1

(51) Int. Cl.
*F01N 3/20*      (2006.01)

(52) U.S. Cl.
CPC ........ *F01N 3/2013* (2013.01); *F01N 2240/16* (2013.01)

(58) Field of Classification Search
CPC ............... F01N 3/2013; F01N 2240/16; F01N 2530/04; F01N 13/16; F01N 13/18; F01N 2240/04; Y02A 50/20; Y02T 10/12
See application file for complete search history.

(56) References Cited

U.S. PATENT DOCUMENTS

| | | | |
|---|---|---|---|
| 2008/0282686 A1 | 11/2008 | Gonze et al. | |
| 2017/0273146 A1 | 9/2017 | Everly et al. | |
| 2022/0220876 A1* | 7/2022 | Ottaviani | ............ F01N 13/1838 |

FOREIGN PATENT DOCUMENTS

| | | |
|---|---|---|
| CN | 101307708 A | 11/2008 |
| CN | 108729990 A | 11/2018 |
| CN | 208138024 U | 11/2018 |
| CN | 209179849 U | 7/2019 |
| DE | 102005011657 A1 | 9/2006 |

(Continued)

OTHER PUBLICATIONS

Extended European Search Report of European Application No. 22155409.0 dated Jul. 25, 2022; 9pp.

(Continued)

*Primary Examiner* — Brandon D Lee
(74) *Attorney, Agent, or Firm* — Hauptman Ham, LLP

(57) ABSTRACT

An exhaust-gas treatment device for arrangement in an exhaust system of a motor vehicle, having a heating element, which is assigned to an exhaust-gas aftertreatment component, for example, a catalytic converter. The heating element is formed by a heating conductor and by a holder coupled to said heating conductor, wherein the holder extends over the cross-sectional area of the heating element, and the holder is formed by a lattice-like structure, wherein the lattice-like structure is formed by arcuate spokes which are coupled to one another in an irregular manner, wherein the heating conductor and the holder have a basin-like configuration as viewed in longitudinal section in an exhaust-gas flow direction.

13 Claims, 6 Drawing Sheets

(56) References Cited

FOREIGN PATENT DOCUMENTS

| DE | 202020104976 U1 | 10/2020 |
|----|-----------------|---------|
| FR | 3096075 A1 | 11/2020 |
| WO | 2012080608 A1 | 6/2012 |

OTHER PUBLICATIONS

Office Action for German Application No. 102021104117.1 dated Oct. 5, 2021; 12pp.
Decision to Grant for German Application No. 102021104117.1 dated Dec. 16, 2021; 13pp.
Office Action for Chinese Application No. 2022101439294 dated Oct. 10, 2022; 7pp.
Office Action for Chinese Application No. 2022101439294 dated Sep. 27, 2022; 4pp.

* cited by examiner

HOLDER FOR AN ELECTRIC HEATING ELEMENT IN AN EXHAUST-GAS AFTERTREATMENT DEVICE

RELATED APPLICATIONS

The present application claims priority of German Application Number 10 2021 103 287.3 filed Feb. 11, 2021, and German Application Number 10 2021 104 117.1 filed Feb. 22, 2021, the disclosures of which are hereby incorporated by reference herein in their entirety.

FIELD

The present disclosure relates to an exhaust-gas treatment device in an exhaust system of a motor vehicle.

BACKGROUND

In order to conform to legislation and meet market or customer expectations, internal combustion engines are nowadays trimmed to the highest efficiency and thus produce the least possible waste heat.

This is contradicted by fast heating of the exhaust-gas components after a cold start, and the adherence to this temperature range during the customary test cycles in order to ensure optimum reaction conditions for the conversion of harmful exhaust-gas constituents into non-harmful elements.

In the case of catalytic converters, this light-off begins at around 180° C., and the reaction rate increases with temperature. Since future approval restrictions assess the exhaust-gas composition directly after a cold start, the light-off temperature should be reached as quickly as possible.

For this purpose, heating elements are used which allow active thermal management of the exhaust system within certain limits. These heating elements are at present normally formed from thin sheet-metal honeycomb structures (fin structures) wound in spiral fashion. The separation of the conductors (honeycomb strands) is ensured by an air gap. The overall structure is stiffened by high-temperature soldering. The electrical insulation of the overall heating matrix is normally realized by means of ceramic pins (support pins), wherein these are pushed into the catalytic converter body.

DE 20 2020 104 976 U1 describes an exhaust-gas treatment device for arrangement in an exhaust system of a motor vehicle.

SUMMARY

An object of the present disclosure is to arrange a heating device in an exhaust system, which heating device is able to be produced inexpensively and easily and at the same time provides highly efficient heating power and has high thermal resistance.

The above-stated object is achieved according to the disclosure by means of an exhaust-gas treatment device for arrangement in an exhaust system of a motor vehicle.

The present disclosure relates to an exhaust-gas treatment device for arrangement in an exhaust system of a motor vehicle. Said motor vehicle has an internal combustion engine. The internal combustion engine is able to be a diesel or gasoline engine. The motor vehicle is able to be a hybrid motor vehicle, which has an additional internal combustion engine. The exhaust-gas treatment device is thus an exhaust-gas aftertreatment device.

The motor vehicle has an exhaust system. An exhaust-gas aftertreatment component in the form of a catalytic converter, is arranged in the exhaust system. A heating element is positioned in the exhaust system upstream or downstream of the catalytic converter in an exhaust-gas flow direction. The heating element serves for electrically externally heating the catalytic converter, for example during the cold-start phase.

The heating element itself is formed by an electric heating element. This is able to be a heating coil or else a honeycomb arrangement. The heating element is an electric resistance heater which, when an electrical current is applied to the heating element, heats up in a short time and then heats the catalytic converter by radiation and/or convection. The heating element is of basin-like configuration as viewed in longitudinal section in the exhaust-gas flow direction. This means that the heating element is configured with the geometrical profile of a frustum or of a funnel. The profile is able to be of stepped or else continuously linear, progressive or degressive configuration in longitudinal section, that is to say in the exhaust-gas flow direction. The exhaust gas flows through the heating element through the porous structure if said heating element is a form of heating lattice, wire fabric or perforated plate. In the context of a heating coil or of a solid heating conductor, the exhaust gas flows around the heating conductor. The exhaust gas however then flows through the entire heating conductor coil between the individual spacings of the heating conductor windings. The arrangement of the heating conductor is however of basin-like configuration as viewed in longitudinal section in the exhaust-gas flow direction, as already mentioned. The heating conductor itself is then either of solid form or is able to be formed from a porous material, for example from a wire mesh. The wire mesh is a wire fabric or a perforated plate. This furthermore offers that the flow is able to pass not only around the heating element but also through said heating element owing to the respective porosity of the heating conductor.

According to the disclosure, a holder is provided for the purposes of arranging the electric heating element in the exhaust system. The electric heating element is coupled to the holder. The holder extends at least over the cross-sectional area of the heating element. The holder itself is likewise of basin-like configuration, such that the arrangement of the longitudinal section of the heating element is securely positioned in the exhaust system. The holder is able to then likewise run in stepped or else linear, progressive or degressive fashion in longitudinal section, and is thus adapted to the basin shape of the heating element.

Here, the basin shape of the holder and also the basin shape of the heating element is able to be directed in the exhaust-gas flow direction. This means that the lowest point of the basin shape is directed in the exhaust-gas flow direction. Here, the basin shape to project into a funnel within the exhaust system and to thus form a maximum heating element area over which flow passes and to optimally utilize the structural space.

In the context of the disclosure, the basin shape is able to be oriented so as to point away from the exhaust-gas flow direction. This means that the lowest point of the basin shape would be impinged on by flow last as viewed in the exhaust-gas flow direction.

For this purpose, the holder is able to be produced, firstly, by virtue of a punched component being formed out of a disk. The arcuately running spokes are then jointly formed. The holder is then subsequently deep-drawn so as to be provided with the basin-like or funnel-like, possibly also frustum-section-like, contour in the exhaust-gas flow direction.

The holder, of radially encircling form, is configured to be larger than the heating element itself. The holder is able to be arranged in a housing of the exhaust-gas aftertreatment device coupled to an inner lateral surface. The holder then holds the heating element such that the heating element is spaced apart from the inner lateral surface of the housing in relation to the radial direction.

In order that the holder is able to hold the heating element itself in an axially spaced-apart manner, the holder itself is configured as a disk-shaped areal element. However, in order that the exhaust gas is able to flow through the holder, the holder itself is not configured as an impermeable disk but has a spider-web-like or a lattice-like structure. This structure is formed according to the disclosure by virtue of the inner surface of the holder in relation to the radial direction being formed by arcuately running spokes that are coupled to one another. Here, these arcuate spokes follow a spline function or have a curved profile. The arcuate shape of the individual spokes gives rise to the high thermomechanical strength of the holder. Expansions and contractions owing to different temperature ranges are thus compensated in the best possible manner owing to the arcuate shape.

The heating element is then coupled to the holder by means of individual coupling points or holding points. Owing to the good thermomechanical strength, the fastening points thus experience only a small change in position owing to expansions or contractions, which in turn has an effect on the thermomechanical strength of the heating element coupled to the holder.

In the context of the disclosure, a spoke need not run radially inward from an externally encircling frame or contour to a hub. In the context of the disclosure, a spoke is a connection that runs in the interior region of the holder. A radially inwardly running orientation does not mean a rectilinearly inwardly running form, but rather means that the spoke has a general orientation toward a radially directed interior space of the holder.

The holder substantially has an outer encircling ring. The spokes are on the one hand oriented radially inwardly from said ring. On the other hand, the spokes are then however of basin-like configuration as viewed in longitudinal section in the exhaust-gas flow direction, resulting in the basin shape of the holder or funnel in a side view. This is produced by way of a deep-drawing process.

After the cutting process or punching process, a deformation process is carried out in order to form the basin shape.

Altogether, the basin shape results in the possibility, on the one hand, of the heating element being arranged in a flow-optimized manner in the exhaust system. Furthermore, owing to the basin shape and the associated offset, a larger heating surface area is able to be provided than in the case of a disk body which is only exclusively substantially two-dimensional. The surface over which flow passes is thus enlarged owing to the basin shape.

The spokes thus connect to one another to form a substantially irregular supporting lattice, and allows for connecting points to be created over the entire cross-sectional area of the heating conductor. At the same time, the flow resistance is extremely low, because, in relation to the overall cross section of the housing of the exhaust-gas aftertreatment component, the spokes cover less than 20%, less than 15% or less than 10% of the cross-sectional area. Large cut-out areas are provided in the holder, such that the exhaust gas is able to flow through the holder and the heating element with virtually negligibly increased flow resistance. The intermediate regions between the spokes are thus open to flow or of cut-out configuration.

The holder is able to be produced as a punched component or else as a cut-out component, by means of a laser cutting process or the like, from a metallic material, from a high-grade steel material that is resistant to exhaust gas; a ferritic or austenitic material is used here.

In each case, two adjacent spokes run oppositely with respect to one another with regard to the arcuate shape. This is able to improve the thermal resistance owing to different expansion behavior.

Spacers are provided in order for the heating element to now be coupled to the holder. Said spacers are in ceramic sleeves. The ceramic sleeves are thermally resistant and electrically non-conductive. A pin, engaging through the ceramic sleeves, is able to be coupled to the holder and to the heating element. The heating element is thus arranged fixedly in position in a form-fitting manner so as to be axially spaced apart from the holder, and is at the same time also electrically insulated. Therefore, when an electrical current is applied to the heating element, no short circuit occurs with the housing of the exhaust-gas aftertreatment component.

In at least one embodiment, the pins, which are able to be referred to as fastening pins, are arranged under preload. The preload is achieved by virtue of the pins being spot-welded. In the presence of ambient temperature, an intense thermal impact is realized during the welding operation, and the pins are welded in form-fitting fashion. When the pin then cools, the pin contracts and thus preloads the holder and heating element, with coupling via the ceramic spacer sleeve. A loose fit, rattling or thermal stresses or expansions are thus reliably prevented.

The abovementioned effect is able to be improved by virtue of two fastening pins being inserted from opposite sides, that is to say so as to be directed toward one another. Said pins are then coupled to one another by welding, at the tips that are in contact with one another. Excess material fuses, and the axial length of the two resulting pins then corresponds, at the end of the welding operation, to the spacing of heating element, spacer sleeve and holder. A fit is produced. After the welding operation, the material contracts, such that the two coupled-together pins contract in their axial direction and thus couple the heating element via the spacer in the form of the ceramic bushing to the holder, with the pins being under preload or tensile stress. Upon later warming during operation, that is to say when exhaust gas flows, the preload has the effect that an expansion of the pins thus does not lead to rattling or a loose holding action. The service life of the holder is thus increased.

The spokes themselves are formed in single-piece and materially integral fashion in the holder.

In at least one embodiment, the holder itself is able to be of multi-layer configuration. Here, there are then three sheet-metal layers. Two outer sheet-metal layers are configured as a respective clamping plate or holder plate. A middle sheet-metal layer is configured as a distancing plate. A respective ceramic sleeve is able to be placed with a collar into an opening of the distancing plate. A clamping region positioned upstream in an axial direction then fixes the collar of the distancing sleeve in the holder itself. The individual layers are able to be coupled to one another cohesively, for example by way of a soldering operation or else a welding operation. This plate assembly is able to be produced first, and for a deformation process to subsequently be performed in order to produce the basin shape.

In at least one embodiment, the heating element is arranged in a sandwich-like manner between two holders in relation to the exhaust-gas flow direction. This means that one holder is positioned upstream of the heating element in the exhaust-gas flow direction and a further holder is positioned downstream of the heating element in the exhaust-gas flow direction. The heating element is thus held optimally in relation to the axial direction even in the case of high flow speeds of the exhaust gas flowing through the exhaust-gas aftertreatment component.

The following description discusses further advantages, features and characteristics of the present disclosure. A least some embodiments are illustrated in schematic figures. These serve for ease of understanding of the disclosure.

DETAILED DESCRIPTION

Figure 1:
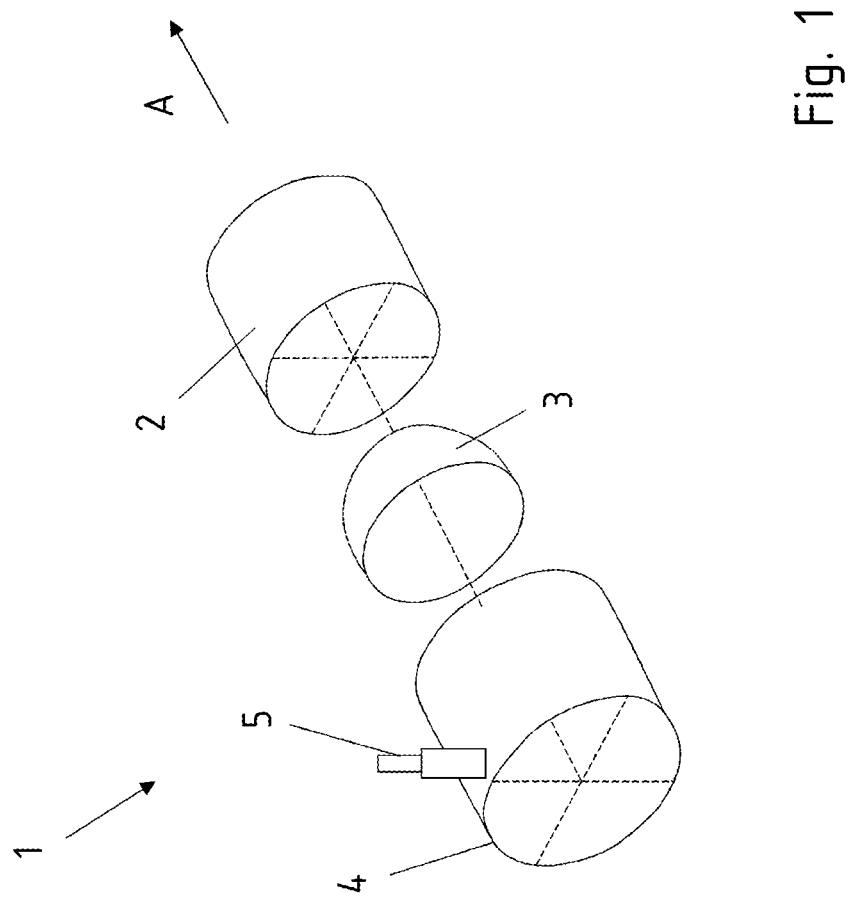
FIG. 1 is an exploded illustration of an exhaust-gas treatment device according to the disclosure.

FIG. 1 shows an exhaust-gas treatment device 1 according to the disclosure for arrangement in an exhaust system of a motor vehicle. For this purpose, a catalytic converter 2 with a heating element 3 positioned upstream in an exhaust-gas flow direction A is arranged in a housing 4. Electrical connectors 5 are able to be provided on the housing 4 such that electrical current is able to be applied to the heating element 3 arranged in the housing 4. In the exhaust-gas flow direction A itself, the heating element 3 is of basin-like configuration. The basin shape is able to be referred to as a frustum or pyramid shape or funnel shape. The configuration in the exhaust-gas flow direction A is able to be referred to as conforming to the geometrical principle of a bowl.

Figure 2:
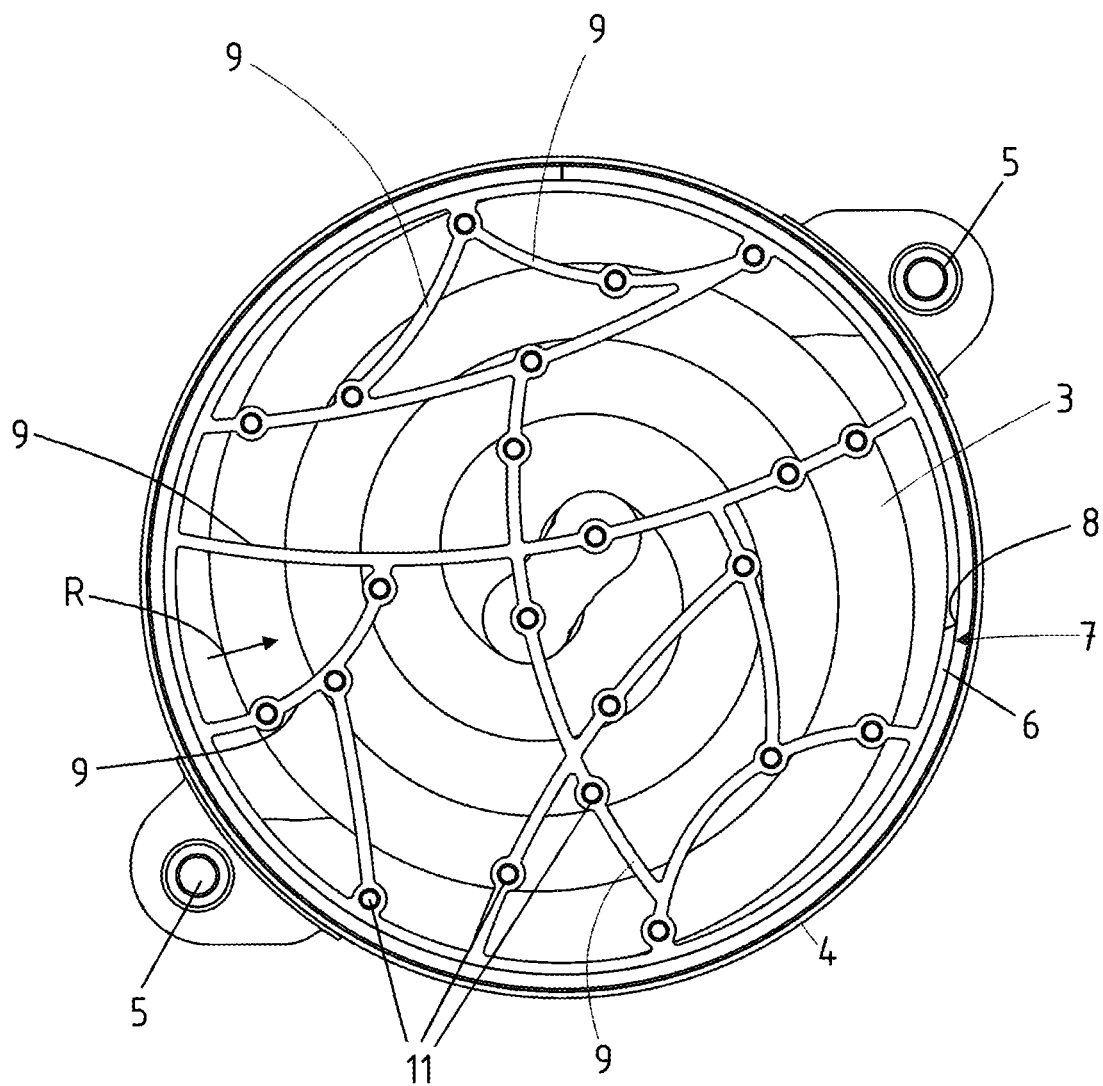
FIG. 2 shows a plan view or end view of a holder according to the disclosure with heating element situated therebehind.

FIG. 2 shows an end view of the heating element 3 in the housing 4. A holder 6 according to the disclosure is positioned upstream of the heating element 3 in the exhaust-gas flow direction A. The heating element 3 is configured as a spirally coiled heating conductor.

The holder 6 is itself formed by a lattice-like structure. An outer encircling frame or an outer encircling contour 7 or ring of the holder 6 is coupled to an inner lateral surface 8 of the housing 4. This is able to be realized for example by soldering or welding. Individual spokes 9 then extend inward in a radial direction R from the outer encircling contour 7, which spokes form a lattice-like structure. The spokes 9 themselves each run in curved or arcuate fashion. In this embodiment, the spokes 9 are distributed in an irregular manner with respect to one another. In each case two adjacent or adjoining spokes 9 are able to run oppositely.

The cross-sectional area of the holder 6 thus substantially covers the cross-sectional area of the inner lateral surface 8 of the housing 4. However, cutouts are provided between the spokes 9, that is to say between the lattice-like structure of the holder 6, such that more than 80, more than 85, more than 90, or more than 95% of the cross-sectional area is provided for the throughflow of exhaust gas. The holder 6 consequently has a negligible effect on the flow resistance of the exhaust gas flowing through the exhaust-gas treatment device 1.

The heating element 3 has a corresponding spacing 10 to the inner lateral surface 8 of the housing 4. The thermal expansion of the heating element 3 therefore does not result in the heating element 3 coming into contact with the housing 4 in a radial direction R, which would result in an electrical short circuit.

Figure 3A:
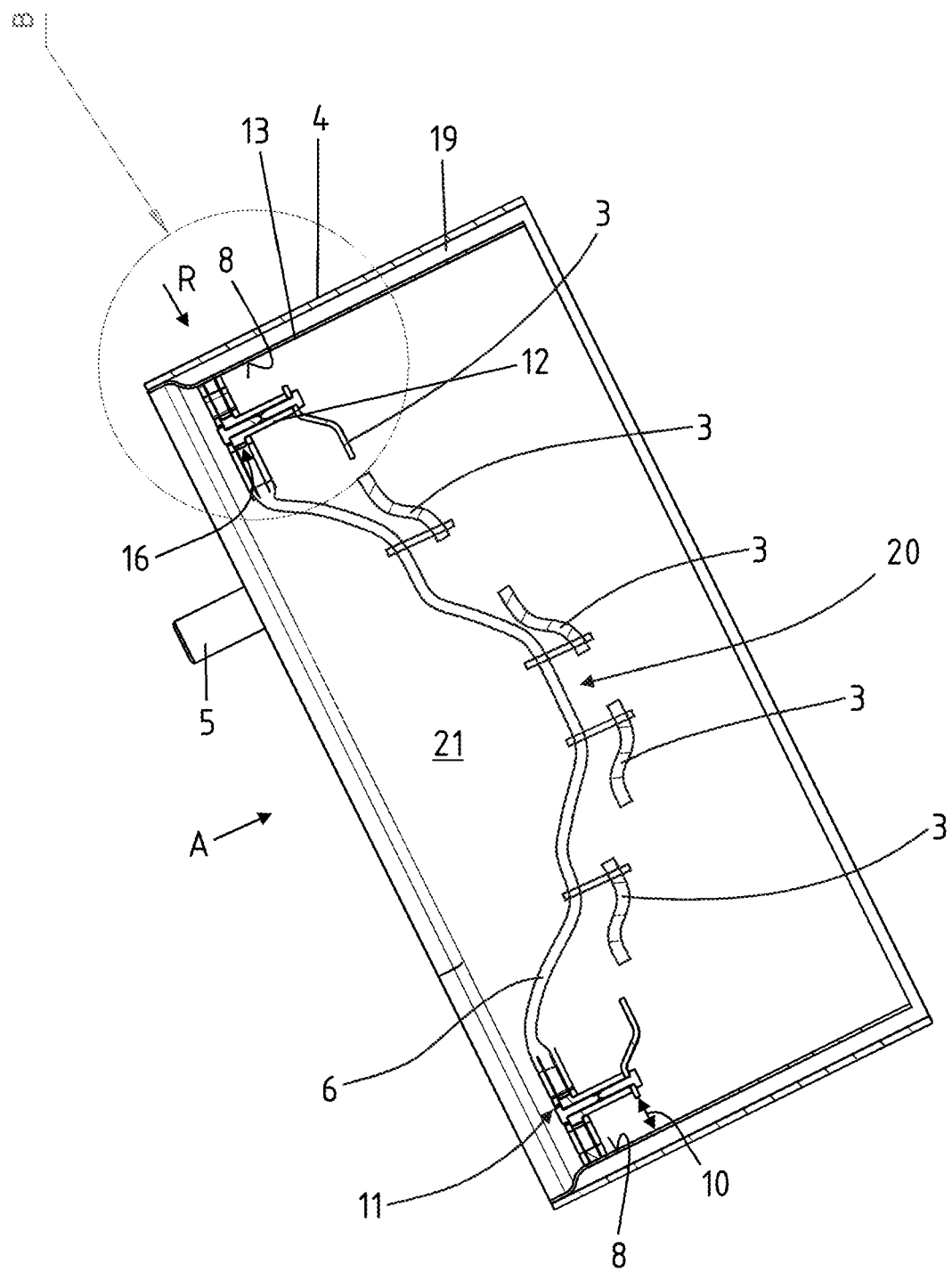
FIG. 3A and FIG. 3B show a respective sectional view from FIG. 2 in accordance with the disclosure.
Figure 3B:
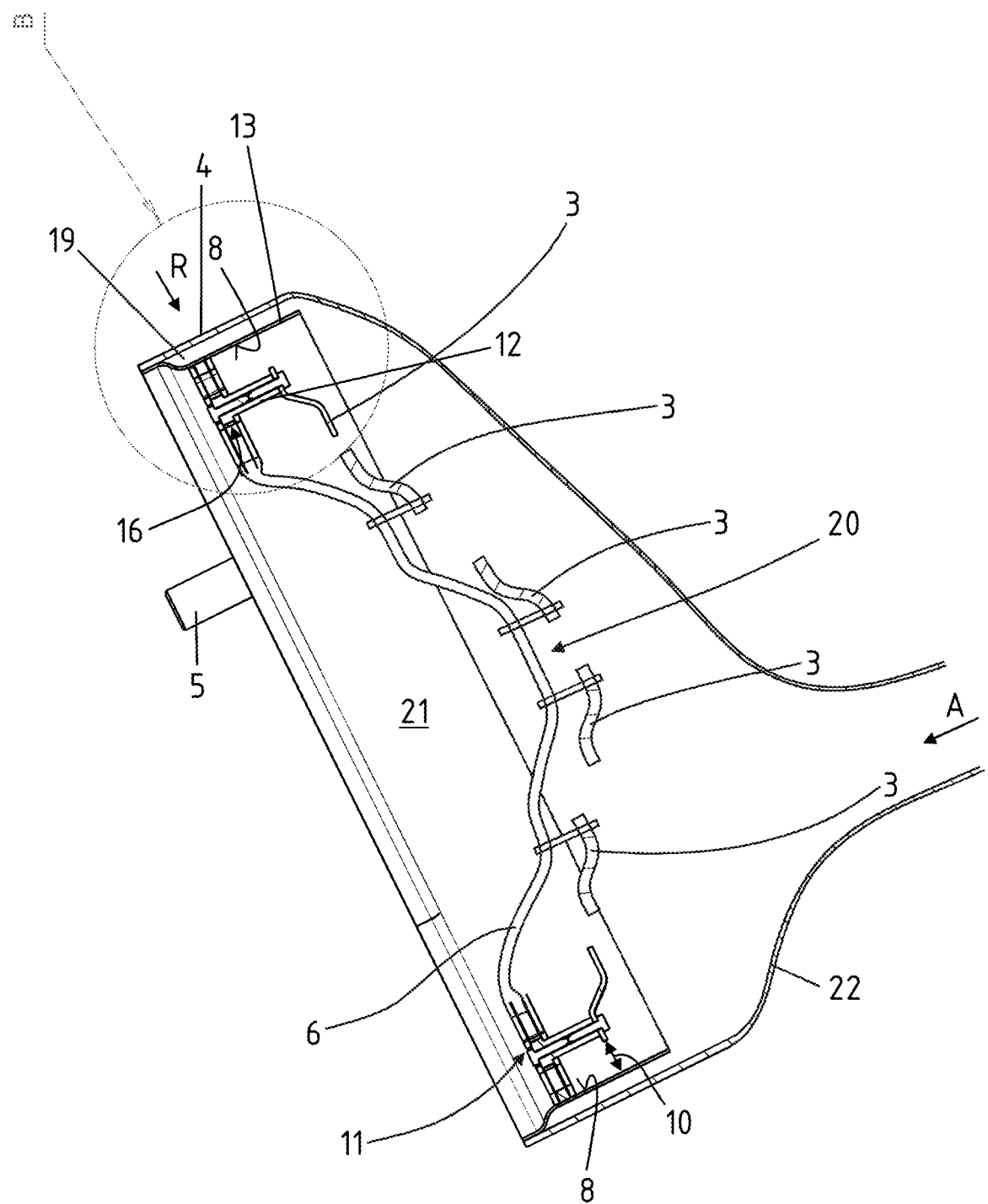

FIG. 3A and FIG. 3B show a longitudinal section in the exhaust-gas flow direction A. The individual windings of the heating element 3 is able to be seen here. The heating element 3 is thus of substantially basin-like configuration as viewed in longitudinal section in the exhaust-gas flow direction A. The same applies to the holder 6. The latter, too, is of basin-like configuration as viewed in longitudinal section in the exhaust-gas flow direction. The profile is able to, as is the case here, be of stepped or layered configuration, in order, to receive the individual windings of a heating conductor of the heating element 3.

The lowest point 20 of the basin shape is oriented so as to point away from the exhaust-gas flow direction A. In the context of the disclosure, this means that the lowest point 20 of the basin shape is impinged on by flow last as viewed in the exhaust-gas flow direction A.

Fastening points 11 are then arranged on the individual spokes 9. Said fastening points 11 have a spacer 12, which is a ceramic sleeve. The heating element 6 is then coupled to the holder 6 itself via the spacer 12. Three fastening points 11 are able to be formed on one spoke 9. Over the entire course of the spokes 9, and considering the thermal expansion, an optimum compensation ratio of provided holding function and compensation of the thermal expansion is able to be achieved.

Figure 4:
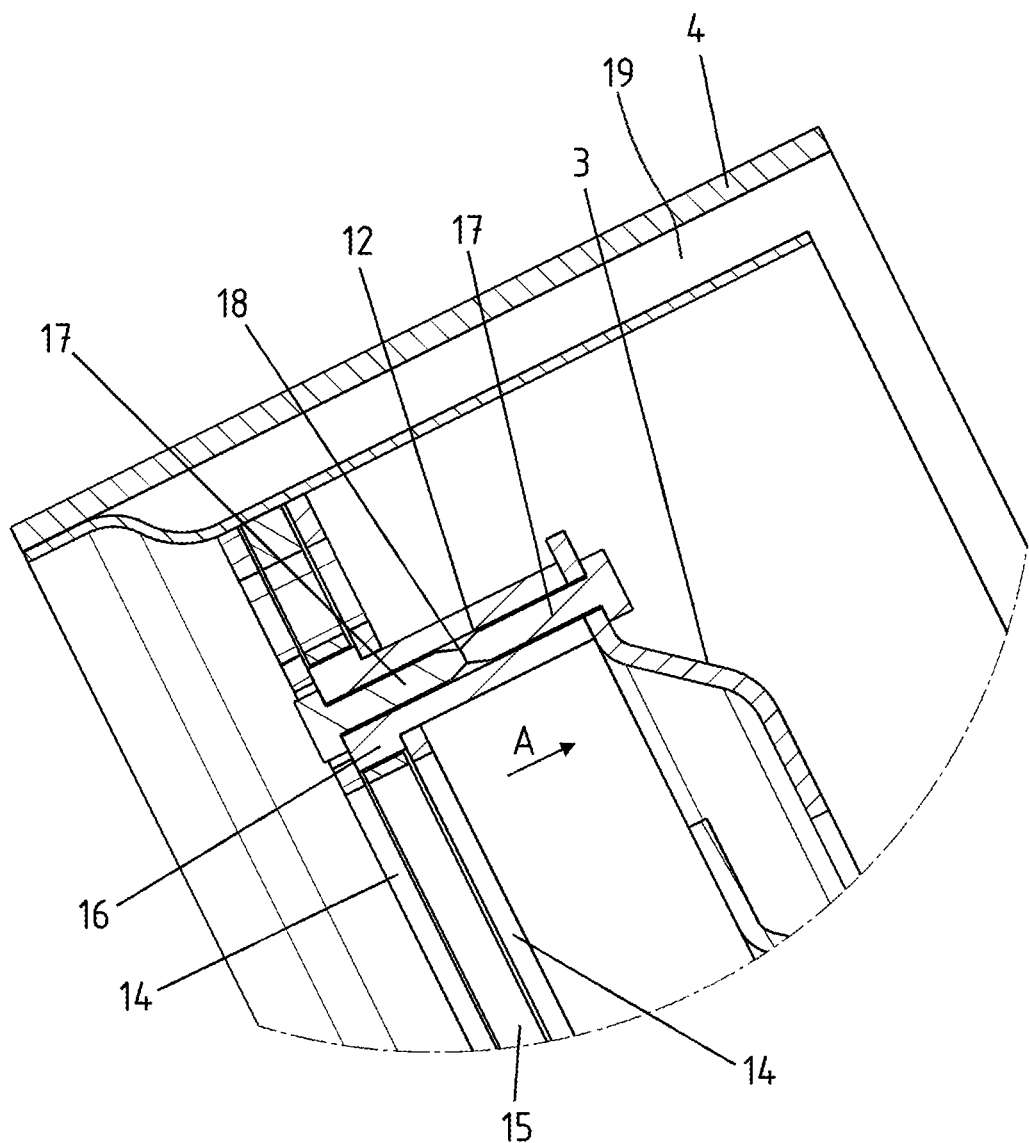
FIG. 4 shows a detail view from FIG. 3 in accordance with the disclosure.

An insert plate 13 is arranged in the housing 4 itself, which insert plate is spaced apart in a radial direction R from the actual inner lateral surface 8 of the housing 4. Thus, in this case, the holder 6 is coupled to the inner lateral surface 8 of the insert plate 13. This results in an air gap 19 for thermal insulation. The insert plate 13 is in the form of a sleeve. FIG. 3A, FIG. 3B and FIG. 4 show that the holder 6 itself is formed in three layers. Said holder has two holding plates 14 situated at the outside in an axial direction and one distancing plate 15 situated in the middle. This gives rise to the following effect according to the disclosure. The spacers 12 in the form of ceramic sleeves have a collar 16 situated at the top. The collar 16 is arranged in a corresponding opening of the distancing plate 15 and is then fixed in position in form-fitting fashion by a holding plate positioned upstream and downstream in the exhaust-gas flow direction A. The respective spacer 12 or the respective ceramic sleeve is thus fixed in position on the holder 6 in form-fitting fashion. The individual layers are able to be cohesively coupled to one another. This is clear once again from the enlarged view in FIG. 4. The heating element 3 is then placed with a fastening pin 17 or a bolt in form-fitting fashion onto an axial end of a spacer 12 and fixed in position in form-fitting fashion by means of the fastening pin 17. Here, fastening pins 17 are inserted from two sides, which fastening pins are coupled to one another at a central coupling point 18, for example, by resistance spot welding. The fastening pin 16 at sides of the holder 6 is in abutting contact exclusively with the spacer 12, which is electrically insulated. Thus, no electrically conductive connection is formed between the heating element 3 and the spacer 12.

In FIG. 3B, the exhaust-gas flow direction A is reversed. The lowest point 20 of the basin shape is thus arranged so as to be oriented in the exhaust-gas flow direction A or toward the exhaust-gas flow direction A. This means that the lowest point 20 is impinged on by exhaust gas first in the exhaust-gas flow direction A. The opening 21 of the basin shape is oriented so as to point away from the exhaust-gas flow direction A.

In FIG. 3A, the opening 21 of the basin shape is arranged so as to be oriented in the exhaust-gas flow direction A.

As per FIG. 3B, a funnel 22 or a funnel-like element or else a diffuser is able to be arranged optimally in the structural space with regard to the arrangement of a heating element 3, because the basin shape is geometrically adapted to the funnel shape and thus optimally utilizes the structural space.

In FIG. 3A, the heating element 3 is positioned downstream of the holder 6 in the exhaust-gas flow direction A. In FIG. 3B, the heating element 3 is positioned upstream of the holder 6 in the exhaust-gas flow direction A. The heating element 3 is able to be positioned downstream of the holder 6 in FIG. 3B.

Figure 5:
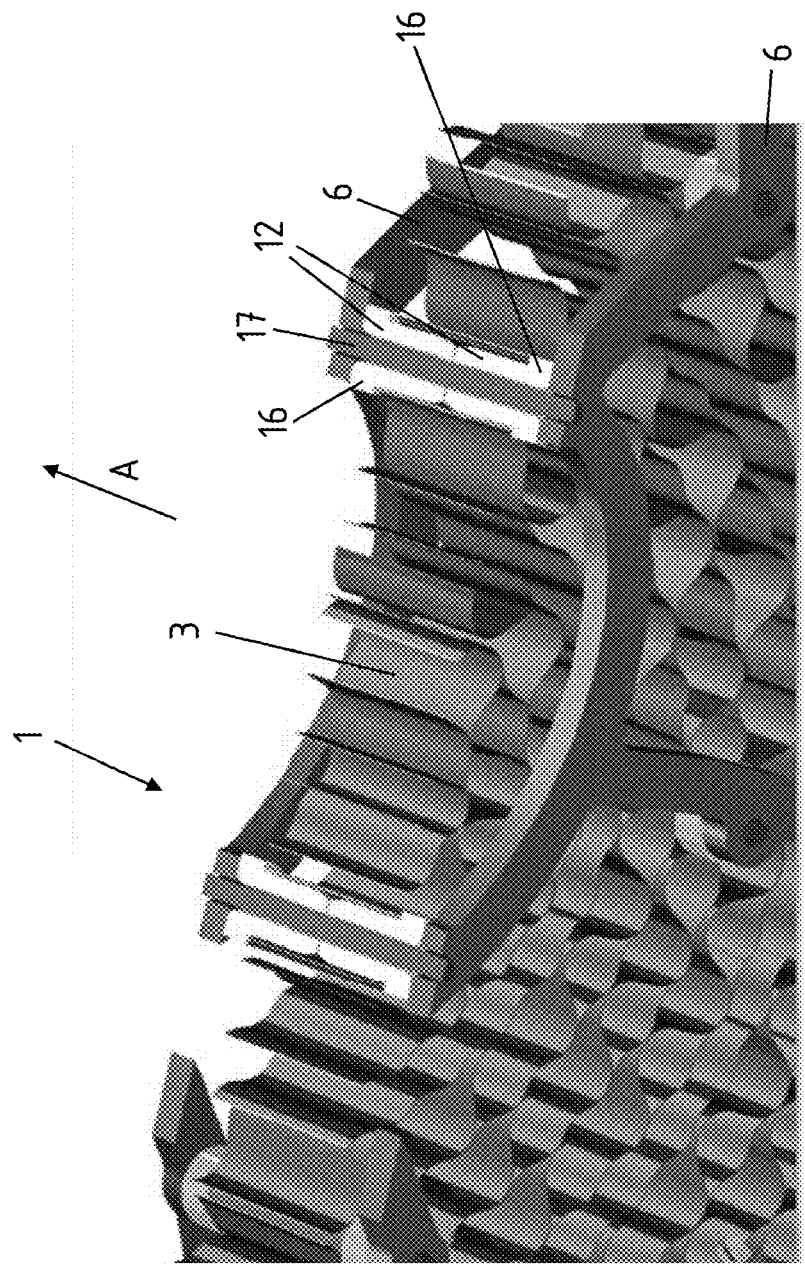
FIG. 5 shows at least one embodiment of a heating element that is arranged between two holders in an exhaust-gas flow direction in accordance with the disclosure.

FIG. 5 shows a sectional view according to at least one embodiment. Here, one holder 6 is positioned upstream of the heating element 3 in the exhaust-gas flow direction 1, and a further holder 6 of the heating element is positioned downstream. The heating element 3 itself is formed by undulating sheet-metal layers. A honeycomb-like structure is thus formed as seen in plan view or as viewed along the exhaust-gas flow. The upstream and downstream holders 6 impart strength to this honeycomb-like structure also in a radial direction R. Spacers 12 are then in turn arranged between the holders 6. The heating element 3 is then arranged, with an axial spacing 10 in each case, on the spacers 12 themselves. A fastening pin 17 engages through the spacers 12 and couples the oppositely situated holders 6 in form-fitting fashion. The fastening pin 17 is able to for example each be spot-welded or soldered to the holders 6. The spacers 12 each have a collar 16, such that the heating element 3 is fixed in position in form-fitting fashion between the collars 16, and is thus arranged in the exhaust-gas treatment device so as to be electrically insulated from the holders 6.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. An exhaust-gas treatment device in an exhaust system of a vehicle, comprising:
    a heating element configured to heat an exhaust-gas aftertreatment component,
        wherein the heating element comprises a heating conductor, and
    a holder coupled to the heating conductor,
        wherein the holder extends over a cross-sectional area of the heating element, the holder comprises a lattice-like structure,
    the lattice-like structure comprises a plurality of arcuate spokes coupled irregularly together, and
    the heating element and the holder comprise a basin-like configuration viewed in a longitudinal section of the exhaust gas treatment device in an exhaust-gas flow direction of the exhaust gas treatment device.

2. The exhaust-gas treatment device according to claim 1, wherein the holder comprises a metallic material.

3. The exhaust-gas treatment device according to claim 1, wherein the heating conductor is a coiled heating conductor.

4. The exhaust-gas treatment device according to claim 1, wherein two adjacent arcuate spokes among the plurality of arcuate spokes have opposed arcuate shapes.

5. The exhaust-gas treatment device according to claim 1, wherein each arcuate spoke of the plurality of arcuate spokes comprises at least one fastening point coupled to the heating element.

6. The exhaust-gas treatment device according to claim 1, wherein the heating element is an electric heating element and comprises a honeycomb-like structure.

7. The exhaust-gas treatment device according to claim 1, further comprising a spacer bushing arranged between the heating element and the holder, and the spacer bushing is electrically insulating and thermally resistant.

8. The exhaust-gas treatment device according to claim 1, wherein the holder comprises two holders, which sandwich the heating element therebetween.

9. The exhaust-gas treatment device according to claim 7, further comprising a pin, wherein the pin engages through the spacer bushing and couples the holder to the heating element.

10. The exhaust-gas treatment device according to claim 9, wherein the pin comprises two pins in the spacer bushing, the two pins point toward one another in opposite directions, each of the two pins having a tip by which the two pins are coupled together.

11. The exhaust-gas treatment device according to claim 1, wherein
    the holder comprises an outer encircling contour configured to be coupled to a housing of the exhaust-gas aftertreatment component, and
    the plurality of arcuate spokes are integrally connected to the outer encircling contour and protrude inwardly in a radial direction from the outer encircling contour.

12. The exhaust gas treatment device according to claim 1, wherein the exhaust gas aftertreatment component is a catalytic converter.

13. The exhaust-gas treatment device according to claim 1, wherein the heating element is an electric heating element and comprises a coiled perforated plate or wire mesh.

* * * * *